April 5, 1927.

C. J. CROPP 1,623,830

VEHICLE CAB

Filed May 5, 1924

Inventor
Claude J. Cropp,
By
Attorney

April 5, 1927. 1,623,830

C. J. CROPP

VEHICLE CAB

Filed May 5, 1924 2 Sheets-Sheet 2

Inventor
Claude J. Cropp,
By
Attorney

Patented Apr. 5, 1927.

1,623,830

UNITED STATES PATENT OFFICE.

CLAUDE J. CROPP, OF DETROIT, MICHIGAN.

VEHICLE CAB.

Application filed May 5, 1924. Serial No. 711,179.

The purpose of the invention is to provide a cab for vehicles, particularly automobiles, which may be readily converted for winter or summer use, the cab being provided with storm windows adapted for what might be considered a partial folding position and also adapted for a full folded position in which free access of the air may be had to the interior of the cab as is desired in summer or good weather.

With this general object in view the invention consists in a certain construction and combination of parts of which a preferred embodiment is illustrated in the accompanying drawings, wherein:—

Figure 1:
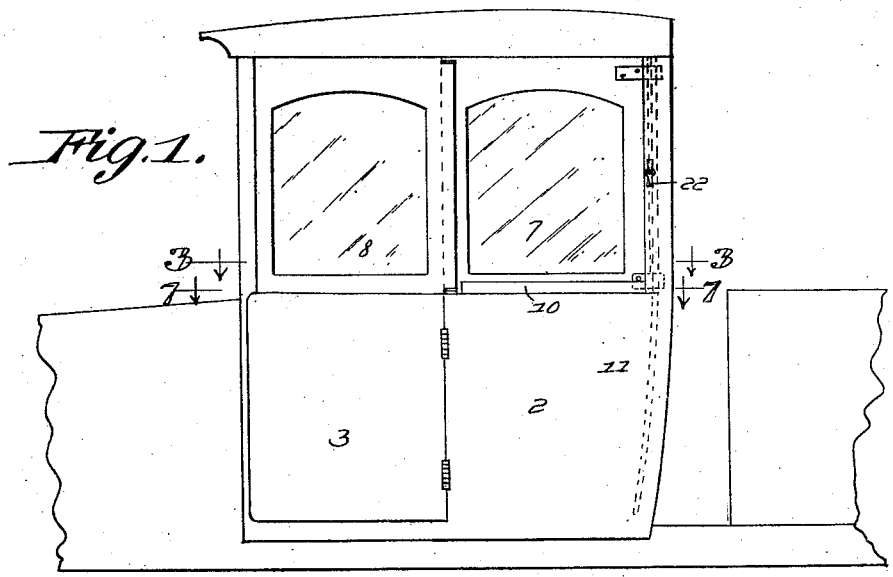
Figure 1 is a side view of a vehicle cab embodying the invention, the storm sash being shown in closed position.
Figure 2:
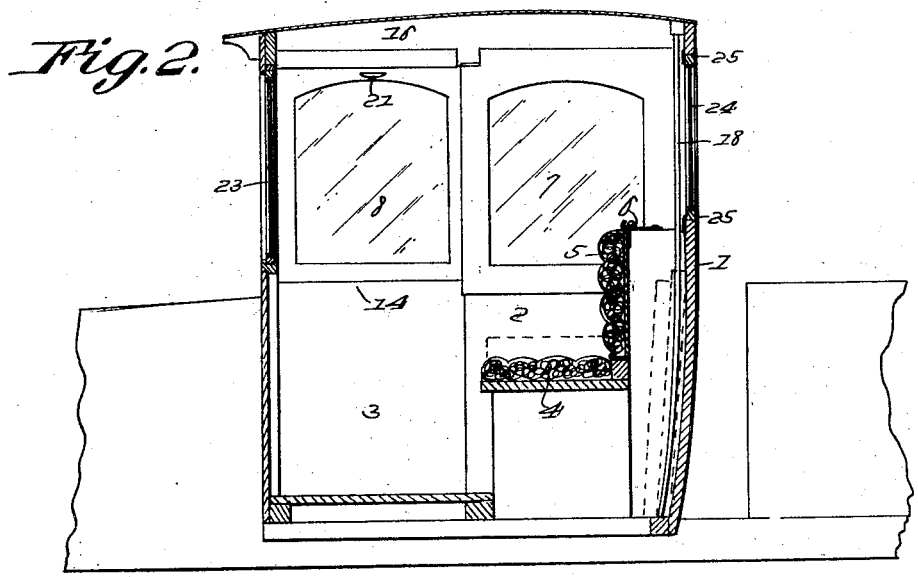
Figure 2 is a central vertical sectional view of the structure of Figure 1, the seat back being shown in its normally raised position and indicated in its temporarily collapsed condition in dotted lines.
Figure 3:
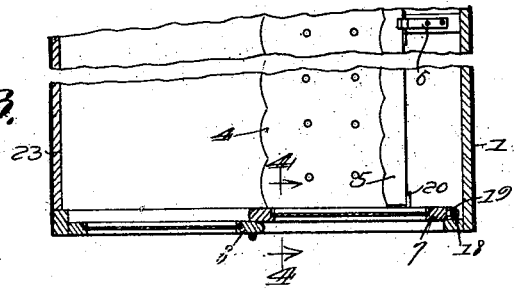
Figure 3 is a horizontal sectional view on the line 3—3 of Figure 1, the forward element of the storm window being shown in closed position.
Figure 4:
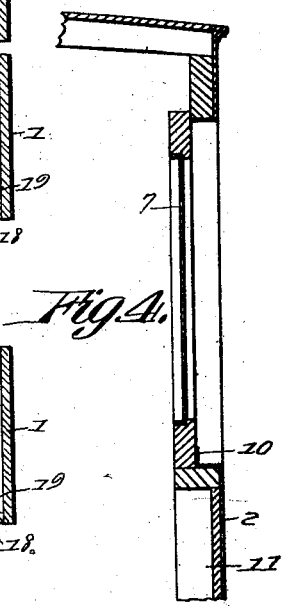
Figure 4 is a section on the line 4—4 of Figure 3.

The cab is preferably adapted for trucks and like vehicles although with proper refinement of design it may be employed in connection with sedans and coupes. In the present instance it is provided with a back 1 and the sides 2 constructed in any acceptable manner, entrance doors 3 being provided on opposite sides to permit access to the cab and a seat 4 being provided and equipped with a hinged or swinging back 5 which is spaced from the back of the cab and held normally in its elevated position by a spring latch 6 of any conventional form.

Figure 5:
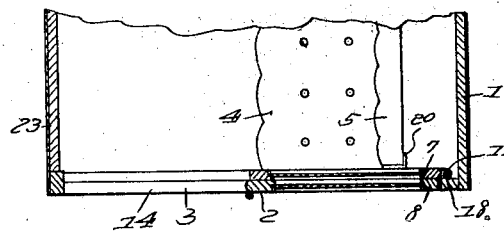
Figure 5 is a view similar to Figure 3, showing the storm windows in partially folded position preparatory to the complete opening of the cab.
Figure 6:
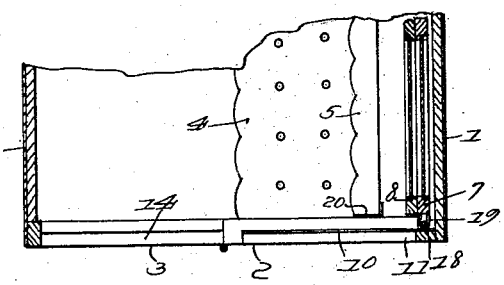
Figure 6 is another view similar to Figure 3 showing the storm window in complete folded position.
Figure 8:
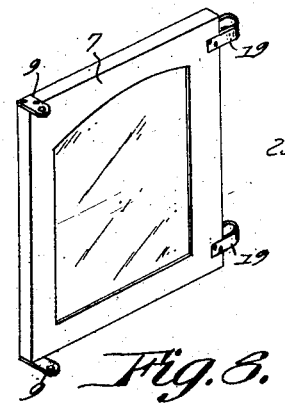
Figure 8 is a detail perspective view of the folding element 7.
Figure 7:
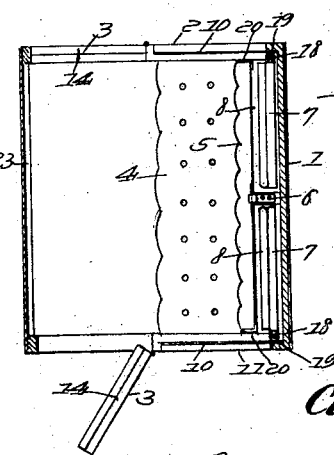
Figure 7 is a horizontal sectional view taken on the line 7—7 of Figure 1 but showing the parts in the position indicated in Figure 6, one of the entrance doors being partially open.

The storm window consists of the foldably connected elements 7 and 8 of which the latter is hinged to the former by pivotal connections with ears 9 projecting laterally from the upper and lower corners of the foldable element 7. The element 8 is therefore offset laterally from the element 7 so that it may be folded back with respect to the latter as indicated in Figure 5. The upstanding flange 10 on the upper edge of the panel 11 of the side wall intervenes between the two elements 7 and 8 when in the folded position indicated in Figure 5 and this flange acts as a stop or abutment flange for the element 7 to limit it to a position substantially in the plane of the panel 11. The intervening of the upstanding flange 10 between the two elements 7 and 8 when in folded position as in Figure 5 holds the two elements 7 and 8 when the latter is folded, that is, folded back over the panel as in Figure 5. While in this position there is no movement possible for the two elements, especially when the button or fastening device 22 is connected to the element 8 to hold it in a folded position. In other words, the flange 10 prevents outward swinging movement of the element 7 and also prevents inward swinging movement of the element 8, that is, when the two elements are folded as in Figure 5. This flange 10 fits between the two elements and acts as a means to prevent undue movement of such parts and to prevent rattling. The door 3 is provided with a stop bead 14 and adjacent the top the cab is also provided with a stop bead 16, the beads 14 and 16 serving as stops for the element 8 when the latter is in position over the door 3, as in the case of the cab being completely enclosed.

The foldable elements 7 and 8 of the storm windows are adapted for complete folding against the back 1 of the cab for disposition behind the back 5 of the seat and to this end the element 7 is pivotally mounted on a rod 18 disposed vertically in the corner of the cab at the juncture of the side and rear walls, the pivotal connection consisting of hinged elements 19 carried by the panel or element 7 for both sliding and turning movement on the rod. In this folding operation, the element 8 is swung outwardly to a position approximating perpendicularity with the element 7, the latter at the same time being swung inwardly, the clearance space longitudinally between the upstanding flange 10 and the bead 14 providing for the passage of the element 8 between them until finally, when it clears them, it may be folded down against the element 7 and the whole swung back against the back wall of the cab which will permit the folded elements to slide down to the floor of the cab. Of course it is necessary that the back be lowered in moving the elements to their folded position behind the seat. A lateral ear 20 projecting inwardly from the panel and behind the back 5 and serves not only to support the back at its end when in its raised position but also serves as a guide to direct the folded elements 7 and 8 to their seat or pocket behind the back. The element 8 of the folding windows is provided with a notch 21 by which they may be raised preparatory to moving them to cab enclosing position.

When the windows are in the partial open position indicated in Figure 5, the element 8 is held in its folded position against the element 7 by means of a button 22 or an equivalent fastening device.

The door 3 is designed to operate and is in every way like the usual doors provided in cabs of this character, as is also the wind shield 23 disposed at the front of the cab.

In order to provide for ventilation through the rear wall or for the circulation of air through the cab, the back 1 is provided with a sliding window 24 mounted in a suitable guide 25.

Having described the invention, what is claimed as new and useful is:—

1. A cab for vehicles comprising a side wall embodying a panel and a corresponding entrance door, an upstanding abutment flange on the panel, a foldable storm window consisting of hingedly connected elements, one being hingedly connected at the rear corner of the cab and adapted to assume a position on one side of the abutment flange, the other element, when folded, adapted to assume a position on the opposite side of the abutment flange, and latch means carried by the cab for operative connection with the folding element, whereby the abutment flange prevents pivotal movement of the two elements toward the back of the cab.

2. A cab for a vehicle having a side wall and a back wall, a fulcrum in the corner of the side and vertical walls extending from the top to the bottom of the cab, the side wall embodying a panel and an entrance door, a foldable storm window consisting of hingedly connected elements disposed in normally parallel planes and of which one is pivotally and slidably mounted upon said fulcrum, whereby it may fold adjacent the back of the cab and down behind a seat of the cab, the other element being folded to a position adjacent the first element on the top edge of the panel, means disposed on the upper edge of the panel for disposition between the two elements, said means holding them in position and assisting in preventing movement of said elements in a direction toward the back of the cab, and a latch carried by the cab to operatively engage with the second said folding element.

In testimony whereof he affixes his signature.

CLAUDE J. CROPP.